United States Patent
Li et al.

(10) Patent No.: US 12,488,446 B2
(45) Date of Patent: Dec. 2, 2025

(54) APPARATUS AND METHODS FOR UNSUPERVISED IMAGE DENOISING USING DOUBLE OVER-PARAMETERIZATION

(71) Applicants: The Regents of the University of California, Oakland, CA (US); Canon Medical Systems Corporation, Otawara (JP)

(72) Inventors: Tiantian Li, Oakland, CA (US); Zhaoheng Xie, Oakland, CA (US); Wenyuan Qi, Vernon Hills, IL (US); Li Yang, Vernon Hills, IL (US); Evren Asma, Vernon Hills, IL (US); Jinyi Qi, Oakland, CA (US)

(73) Assignees: The Regents of the University of California, Oakland, CA (US); Canon Medical Systems Corporation, Otawara (JP)

(*) Notice: Subject to any disclaimer, the term of this patent is extended or adjusted under 35 U.S.C. 154(b) by 408 days.

(21) Appl. No.: 17/961,365

(22) Filed: Oct. 6, 2022

(65) Prior Publication Data
US 2023/0237638 A1    Jul. 27, 2023

Related U.S. Application Data

(60) Provisional application No. 63/302,449, filed on Jan. 24, 2022.

(51) Int. Cl.
*G06T 7/00* (2017.01)
*G06T 5/70* (2024.01)

(52) U.S. Cl.
CPC .............. *G06T 7/0004* (2013.01); *G06T 5/70* (2024.01); *G06T 2207/10081* (2013.01);
(Continued)

(58) Field of Classification Search
CPC ............... G06T 7/0004; G06T 5/70; G06T 2207/10081; G06T 2207/10088;
(Continued)

(56) References Cited

U.S. PATENT DOCUMENTS

2010/0046821 A1* 2/2010 Manjeshwar .......... A61B 6/032
382/131
2019/0365341 A1* 12/2019 Chan ........................ G06N 3/08
(Continued)

FOREIGN PATENT DOCUMENTS

WO    WO-2023106479 A1 *  6/2023    ............... G06T 5/60

OTHER PUBLICATIONS

You et al., "Robust recovery via implicit bias of discrepant learning rates for double over-parameterization", arXiv Prepr arXiv200608857 (2020) (Year: 2020).*

*Primary Examiner* — Van D Huynh
(74) *Attorney, Agent, or Firm* — Oblon, McClelland, Maier & Neustadt, L.L.P.

(57) ABSTRACT

A method, apparatus, and non-transitory computer-readable storage medium for image denoising whereby a deep image prior (DIP) neural network is trained to produce a denoised image by inputting the second medical image to the DIP neural network and combining a converging noise and an output of the DIP network during the training such that the converging noise combined with the output of the DIP network approximates the first medical image at the end of the training, wherein the output of the DIP network represents the denoised image.

14 Claims, 11 Drawing Sheets

(52) U.S. Cl.
CPC ............... *G06T 2207/10088* (2013.01); *G06T 2207/10104* (2013.01); *G06T 2207/20081* (2013.01); *G06T 2207/20084* (2013.01)

(58) Field of Classification Search
CPC . G06T 2207/10104; G06T 2207/20081; G06T 2207/20084; G06T 5/60; G06T 2207/30096
See application file for complete search history.

(56) References Cited

U.S. PATENT DOCUMENTS

| | | | |
|---|---|---|---|
| 2021/0264282 A1* | 8/2021 | Collomosse | G06N 3/048 |
| 2023/0059132 A1* | 2/2023 | Li | G06N 3/088 |
| 2023/0206401 A1* | 6/2023 | Liu | G06N 3/045 |
| | | | 382/157 |

* cited by examiner

Input: CT or MRI image

Label: Noisy PET or SPECT image

DOP alpha =4

DOP alpha =7

DIP

DOP alpha =3

DOP alpha =6

TOF PSF + Gaussian filter

DOP alpha =2

DOP alpha =5

TOF PSF

APPARATUS AND METHODS FOR UNSUPERVISED IMAGE DENOISING USING DOUBLE OVER-PARAMETERIZATION

CROSS-REFERENCE TO CO-PENDING APPLICATION

The present application is related to and claims priority under 35 U.S.C. § 119(e) to provisional application Ser. No. 63/302,449, filed Jan. 24, 2022. The contents of that application are incorporated herein by reference.

BACKGROUND

Field of the Disclosure

The present disclosure relates to a method, apparatus, and non-transitory computer-readable storage medium for image denoising, and in one embodiment to a method and system for unsupervised image denoising using double-over parameterization.

Description of the Related Art

Deep image Prior (DIP) is an unsupervised method for image recovery and it has been successfully applied to PET image denoising. However, DIP-based methods rely on early stopping of the training process to avoid overfitting to the noisy image. Recently, You et al. proposed a double over-parameterized (DOP) approach in their paper You C, Zhu Z, Qu Q, Ma Y., *Robust recovery via implicit bias of discrepant learning rates for double over-parameterization*, arXiv Prepr arXiv200608857 (2020) available at the arxiv.org website as "/pdf/2006.08857.pdf"

SUMMARY

The DOP method of You et al. can be extended for use with PET image recovery by utilizing CT images from the same patient as anatomical prior information.

BRIEF DESCRIPTION OF THE DRAWINGS

A complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1A:
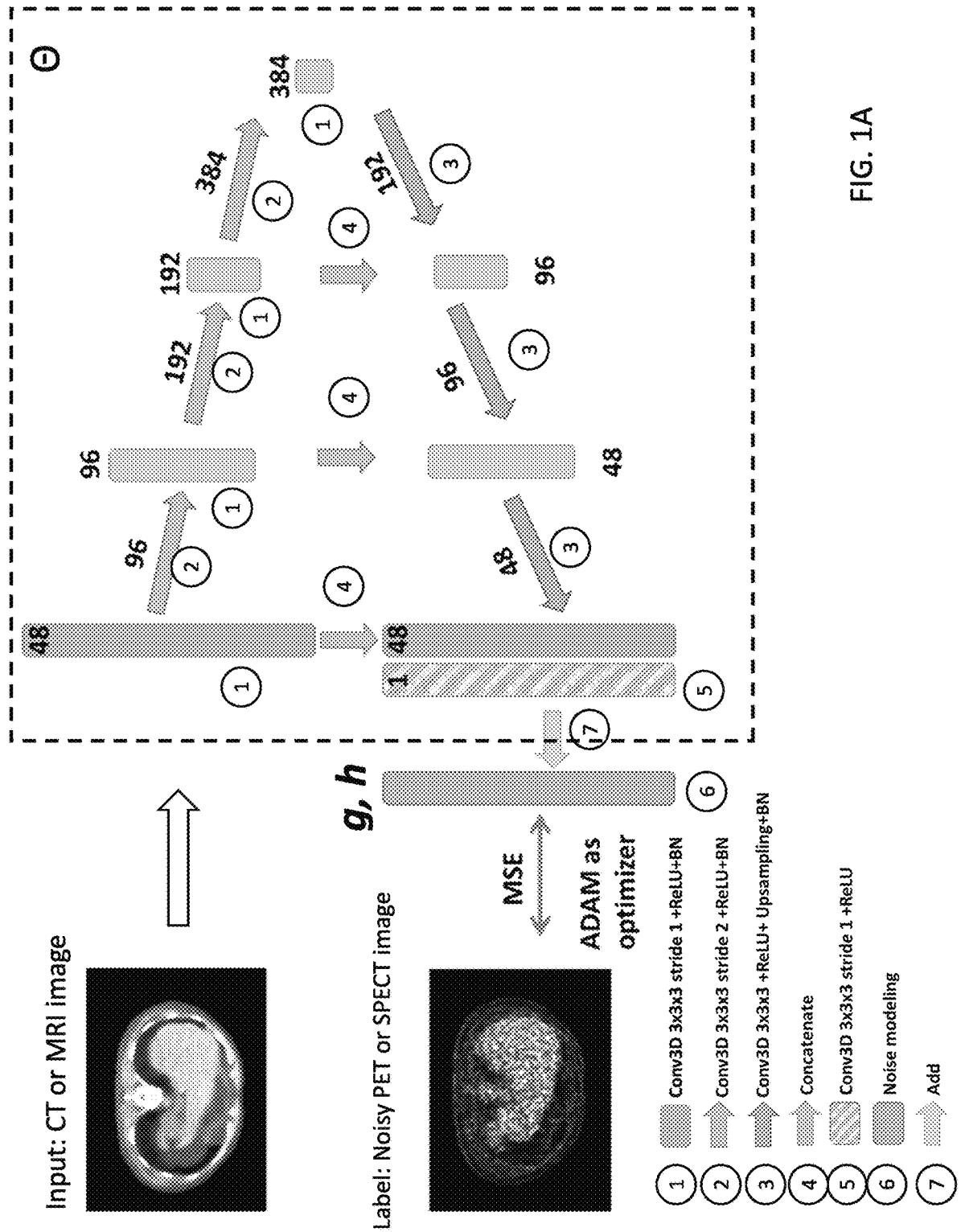
FIG. 1A is a flow diagram of a method of performing image denoising in a medical imaging environment.
Figure 1C:
FIG. 1C is an exemplary input image acting as anatomical prior information.
Figure 1B:
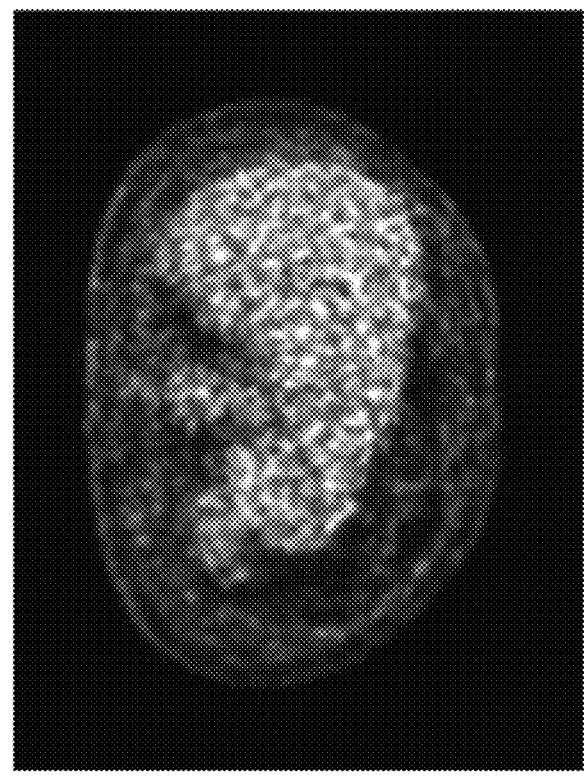
FIG. 1B is an exemplary noisy PET image to be denoised via the denoising process of FIG. 1A.

The present disclosure describes a method for image denoising of medical images using a neural network that is trained during the denoising process. According to one aspect, a computed tomography (CT) image or a Magnetic Resonance Imaging (MRI) image from a same patient as is being imaged with a PET scanner (or a single-photon emission computerized tomography (SPECT) scanner) can be used as anatomical prior information. As shown in FIGS. 1A and 1C, a CT image can be used as an input to a neural network to be trained although an MRI image can be used as well. As shown in FIGS. 1A and 1B, the image to be denoised is a noisy PET image of the same area as was previously imaged for the patient using the CT scanner (e.g., of FIG. 7) although a SPECT image can be used as well.

To achieve image denoising, a clean image $\bar{y}$ is recovered from its corrupted version $y = \bar{y} + n$ by a nonlinear least squares problem with double over-parameterization:

$$\min_{\theta,g,h}\|y - f(\theta) + g \circ g - h \circ h\|_2^2,$$

where $\bar{y}=f(\theta)$ and $f(\cdot)$ denotes a deep neural network, and $n=g \circ g - h \circ h$ is the image noise. A U-shaped encoder-decoder network is illustrated in FIG. 1A with skip connections to represent the clean image. The number of feature channels is listed under each layer. The number of trainable parameters for DOP is: 9,161,401 ($\theta$: 3,155,641; g, h: 6,005,760). The DIP network uses the same network structure as $\theta$. Each layer of the network includes a 3D convolution, ReLU activation, and batch normalization. The noise layer is modeled by two g and h vectors of the same size as the training label image (illustrated as a noisy PET image and sometime referred to as a target image) and is added to the output of the decoder. A patient dataset acquired on a Canon Cartesion TOF PET/CT scanner was used to evaluate the resulting denoising effect. The injected $^{18}$FDG activity was 100 MBq and PET/CT imaging started at 60 min post-injection. A 6-bed emission scan was acquired for 1.5 min per bed position. The PET images were reconstructed using OSEM with 3 iterations 12 subsets (matrix size, 337×337× 129; voxel size, 2.11×2.11×2.11 mm$^3$). The noisy PET image was cropped to 136×184×120 pixels and used as the training label image and a co-registered CT image of the same size was employed as the network input. (As a result, the g and h vectors also each were 136×184×120 pixels.) The input image need not be the same size as the training label image, and the input image may be downsampled or upsampled to be matched to the size of the training label image, especially where random noise is used as the input.

Although the architecture is illustrated as using an ADAM optimizer, other optimizers (e.g., stochastic gradient descent optimizers) can be used instead. An initial learning rate of 5e$^{-4}$ was selected. The g and h vectors also were initially filled with small random values (e.g., values on the order of 5e$^{-4}$ that have a Gaussian distribution). By initializing g and h with small random values, a difference of the convolutions of g and h (i.e., $g \circ g - h \circ h$) converges to the noise, and at least in the context of PET images converges even if the noise is not sparse.

Figure 2D:
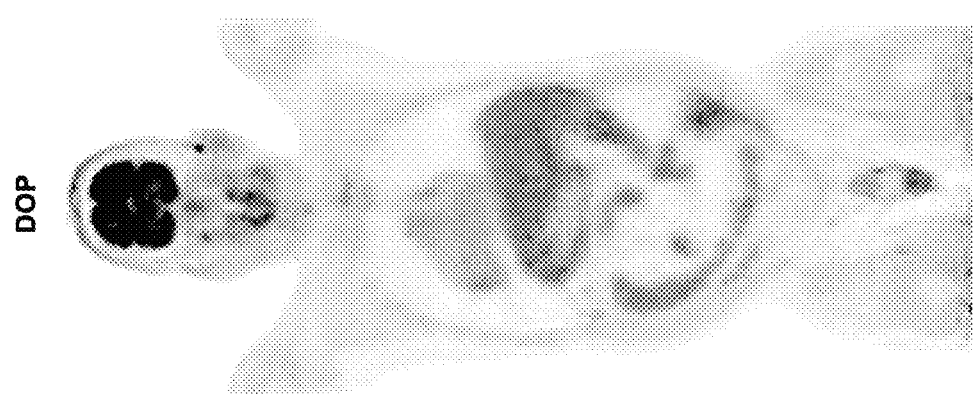
FIG. 2D is a PET image generated by denoising the original PET image of FIG. 2A according to techniques described herein.
Figure 2C:
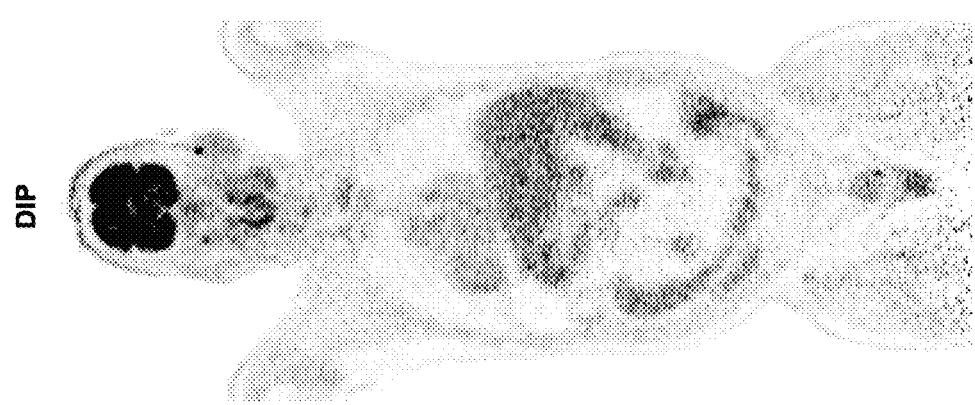
FIGS. 2B and 2C are denoised images versions of the original PET image of FIG. 2A after denoising using Gaussian filtering and using DIP; respectively.
Figure 2B:
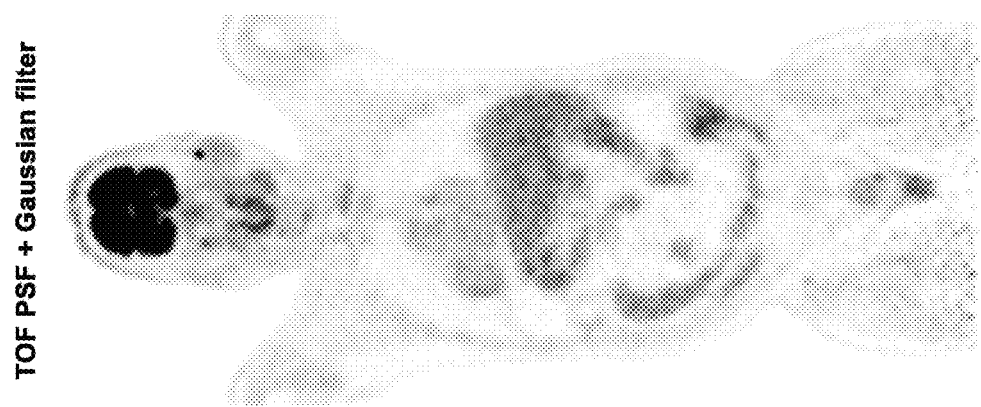
Figure 2A:
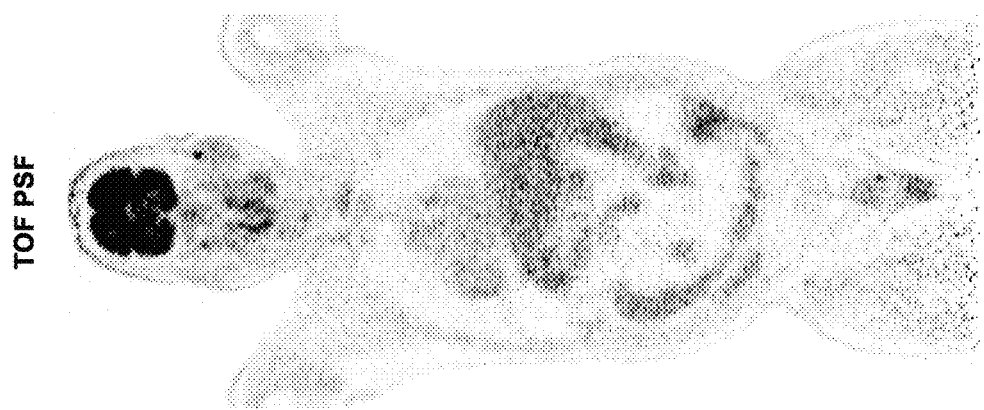
FIG. 2A is an original PET image generated using TOF OSEM with PSF.
Figure 3C:
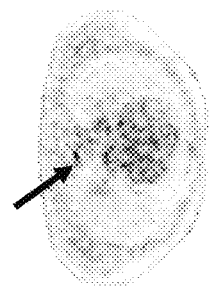
FIGS. 3B and 3C are denoised images versions of the original PET image of FIG. 3A after denoising using Gaussian filtering and using DIP; respectively; with the simulated lesion being visible therein.
Figure 3F:
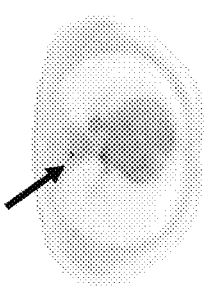
FIGS. 3D-3I are a series of PET images generated by denoising the original PET image of FIG. 3A according to the techniques described herein, with the simulated lesion being visible therein.
Figure 3I:
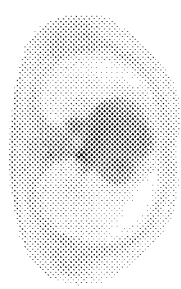
Figure 3B:
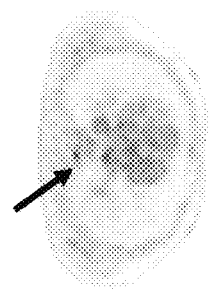
Figure 3E:
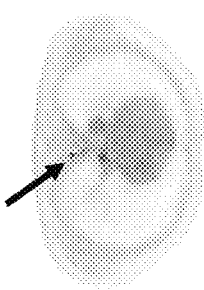
Figure 3H:
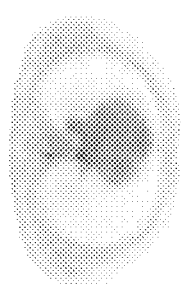

Different learning rates were used for $\theta$ and g, h, and the ratio was controlled by a parameter $\alpha$. The network was trained for 2000 epochs for each bed position. The effect of the discrepant learning rates ratio $\alpha$ on the quality of image recovery is illustrated in FIGS. 3D-3I and can be compared with those from the DIP method and traditional Gaussian post filtering as shown in FIGS. 3B and 3C. In general, the present method of FIG. 2D showed significant noise reduction compared with the original noisy PET image of FIG. 2A and the Gaussian post filtered image of FIG. 2B. Though the learning curves were close to zero for both DOP and DIP, the denoised image of FIG. 2D does not exhibit any overfitting problem compared with the DIP method of FIG. 2C. The discrepant learning rates ratio $\alpha$ controlled the convergence point. With an increasing a, the resulting image become smoother. As shown in FIGS. 3E and 3F, $\alpha=3$ or 4 produce good image denoising while keeping most fine details. Quantitatively the DOP method produced better contrast versus background noise tradeoff than the DIP method of FIG. 3C and the Gaussian filtering method of FIG. 3B. Furthermore, the DOP method with discrepant learning rates can improve PET image quality without need to tune network width or perform early termination. The discrepant learning rates ratio $\alpha$ can be tunned to control the smoothness of the image based on domain-specific applications.

In order to address domain-specific imaging issues, more than one neural network can be trained (either serially or in parallel) using different parameters $\alpha$, and a diagnosing medical professional can have each of the resulting images displayed so that the medical professional can select the image with the proper noise and smoothness levels. The system can track the imaging conditions of early imaging studies and the parameter $\alpha$ that the medical professional used previously and first perform the imaging denoising with the same parameter $\alpha$ as was used in a number of previous image denoising process (e.g., by tracking a most commonly used parameter $\alpha$ either generally or on an imaging protocol-specific basis). Subsequent denoisings can then be performed at other close values of the parameter $\alpha$. For example, if a medical professional most frequently uses a parameter $\alpha=3$ for imaging process X1, then later denoising for imaging process X1 will be performed using parameter $\alpha$ followed by denoisings using a parameter $\alpha=2.5$ and a parameter $\alpha=3.5$. The resulting denoised images can be displayed to the medical professional as they become available. Alternatively, the system can use parallel processing techniques to perform n denoisings in parallel (e.g., with a parameter $\alpha=3$, a parameter $\alpha=3.5$, and a parameter $\alpha=2.5$). Other denoisings that are further away from the most commonly used can be performed later. For a different imaging protocol, X2, a most commonly used parameter $\alpha$ may be $\alpha=4$, and the system could instead start with that parameter value when processing X2-style images.

As described herein, a convolution-based function of vectors g and h is used to represent the noise of the image that are to be modeled separately so that the neural network does not get trained to produce a noisy image. In some embodiments, that image noise should have a Poisson or Gaussian-like distribution. In an alternate embodiment, at least one of the vectors g and h is trained to constrain the learned noise pattern to follow a Gaussian or Poisson distribution during training.

Although the above has been discussed with respect to denoising a PET image with respect to FIGS. 1A-1C, 2D, and 3D-3I, the techniques also are applicable for other types of images. For example, an ungated cardiac CT image can be used as anatomical prior information when denoising a gated cardiac CT image.

Figure 4A:
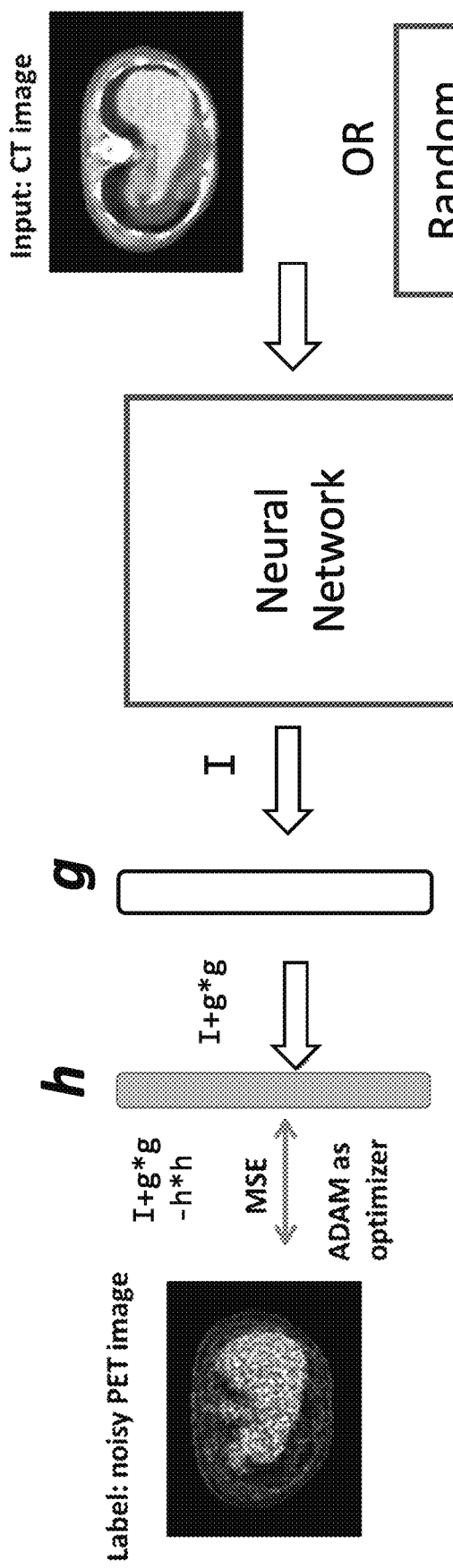
FIG. 4A is a flow diagram showing an alternate configuration according to techniques described herein.
Figures 4B, 4C:
FIG. 4B is an illustration of the contents of the g and h vectors before training.
FIG. 4C is an illustration of the contents of the g and h vectors after training.

In addition, it further is possible to use the techniques described even when a lower noise image is not available to be used as anatomical prior information. As shown in FIG. 4A, it is also possible to use random noise as the original input image. FIGS. 4B and 4C illustrate the contents of the g and h vectors before and after training, in both FIGS. 1A and 4A.

In yet another alternate embodiment, more than two noise vectors (g and h) can be used to model the noise of the image to be denoised so that the system can learn more than two types of noise. For example, three noise vectors can be used.

Figure 3A:
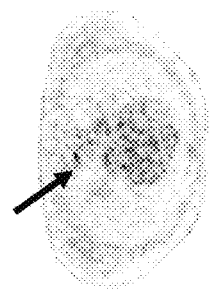
FIG. 3A is an original PET image generated using TOF OSEM with PSF and including a simulated lesion inserted for quantitative analysis; —
Figure 3D:
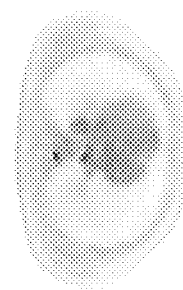
Figure 3G:
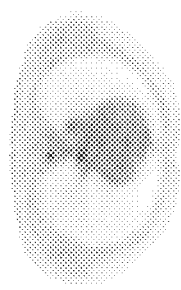
Figure 8:
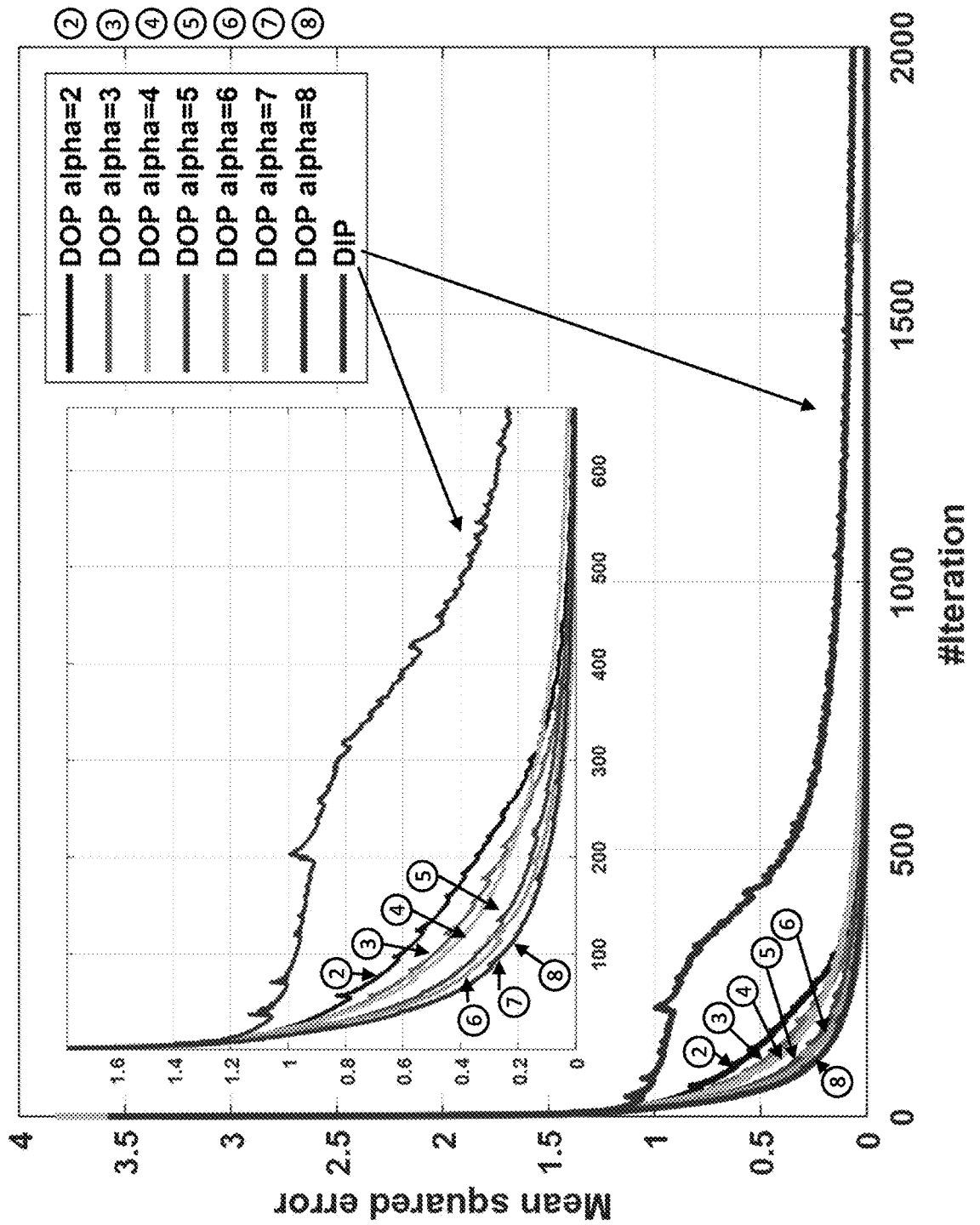
FIG. 8 is a graph illustrating training loss curves for the method described herein with various a and compared with the DIP method.
Figure 9:
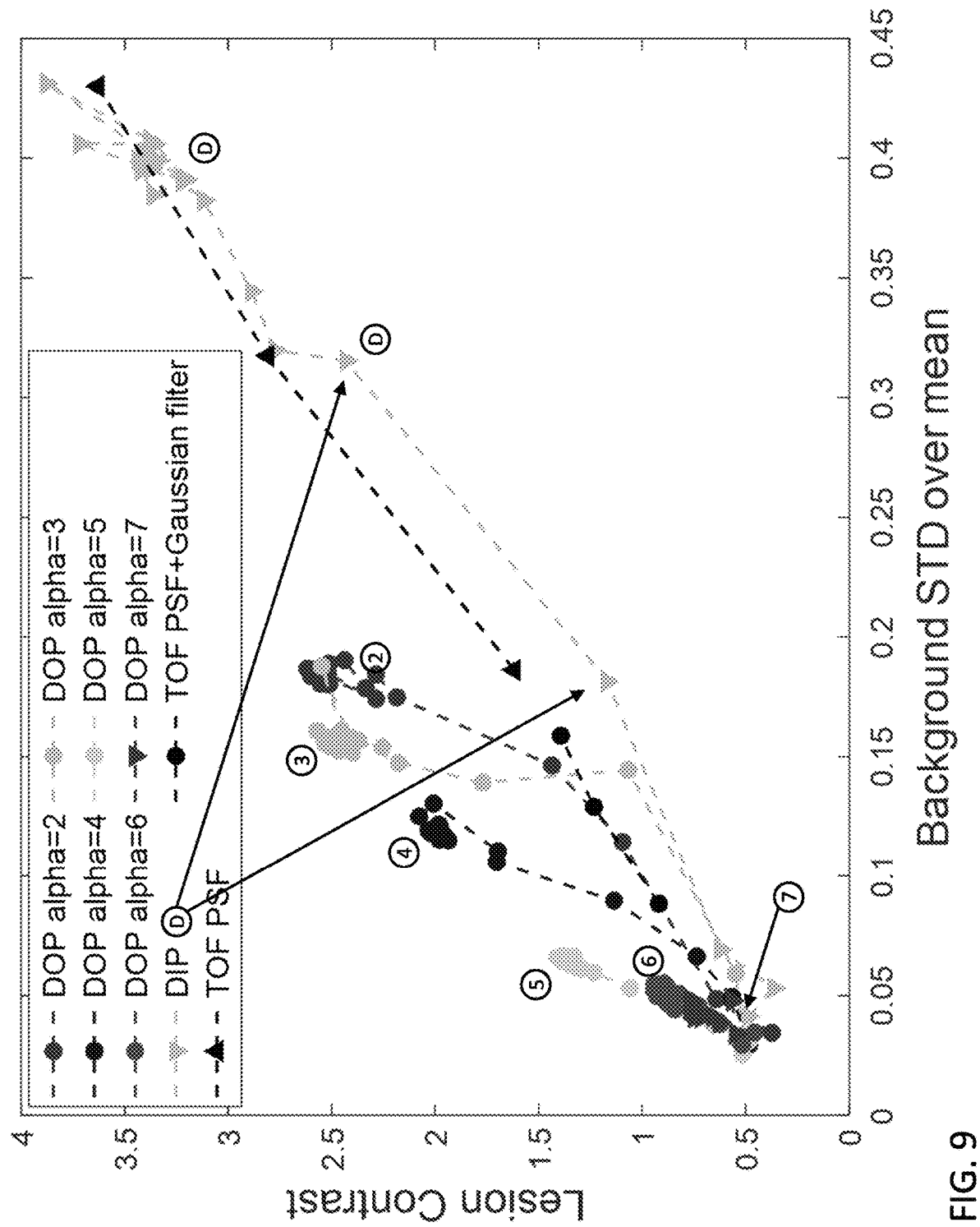
FIG. 9 is a graph of contrast versus noise curve for the inserted lesion marked in FIG. 3A comparing the DOP and DIP (plotted for every 100 epochs), and also comparing TOF OSEM with PSF reconstructions with and without Gaussian post filtering (plotted for every iteration).

FIG. 8 illustrates training loss curves for the method described herein with various a and compared with the DIP method. FIG. 9 is a graph of contrast versus noise curve for the inserted lesion marked in FIG. 3A comparing the DOP and DIP (plotted for every 100 epochs), and also comparing TOF OSEM with PSF reconstructions with and without Gaussian post filtering (plotted for every iteration).

Figure 5:
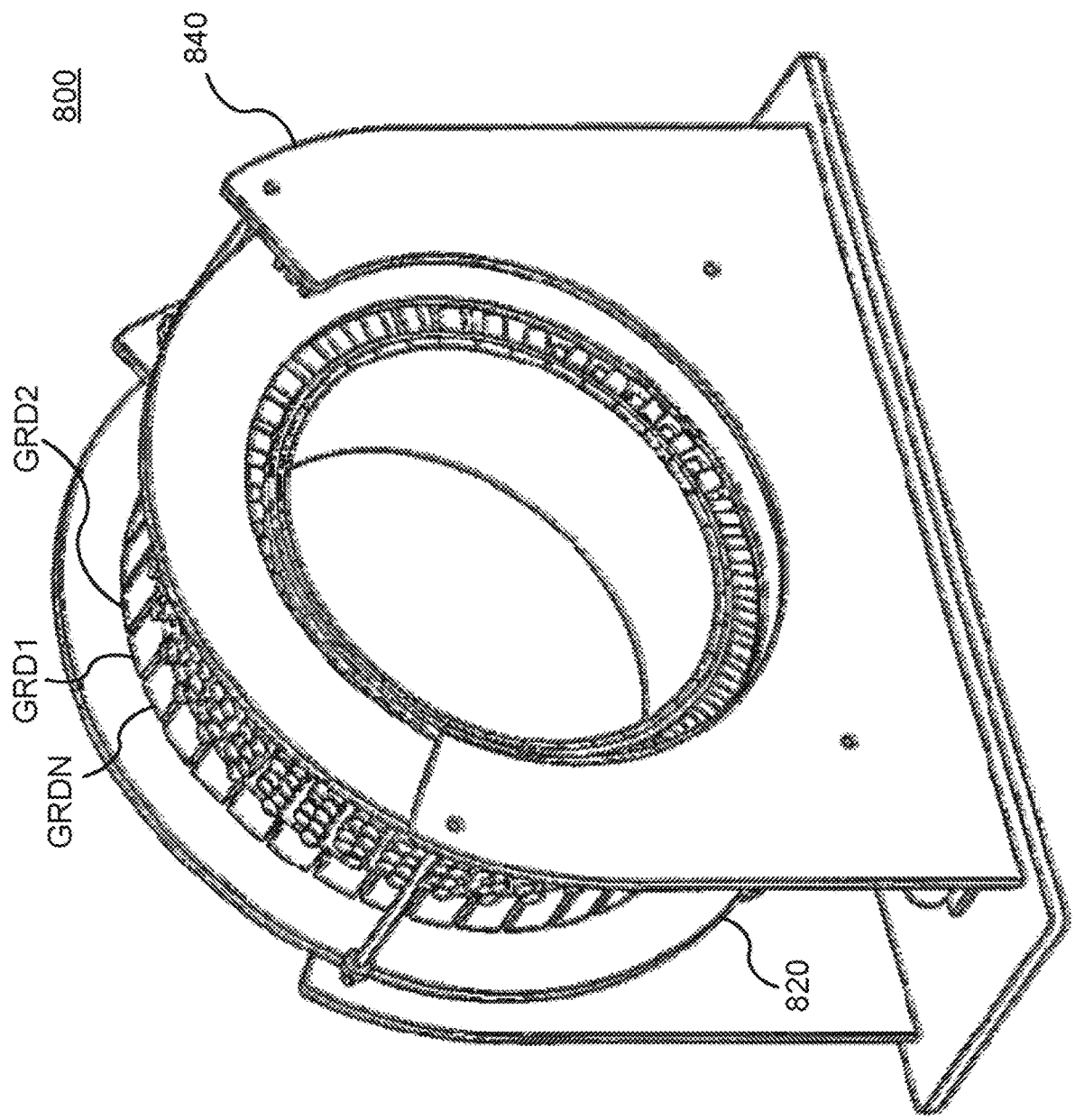
FIG. 5 shows a perspective view of a positron-emission tomography (PET) scanner, according to one aspect of the disclosure.
Figure 6:
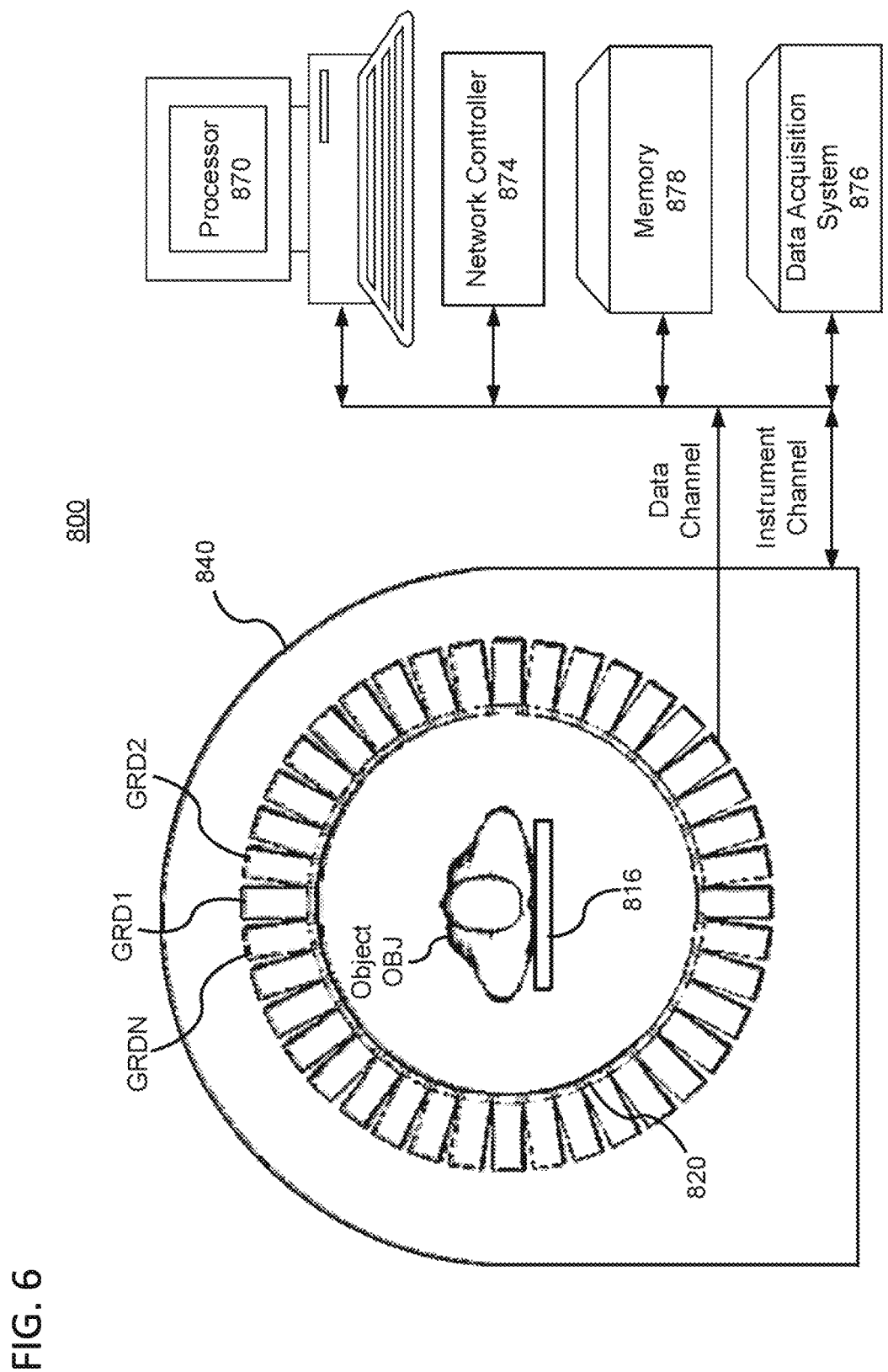
FIG. 6 shows a schematic view of the PET scanner of FIG. 5, according to one aspect of the disclosure.

FIGS. 5 and 6 show a PET scanner 800 including a number of GRDs (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 800.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs. Further, each GRD can include a number of PMTs of various sizes, each of which is arranged to receive scintillation photons from a plurality of detector crystals. Each PMT can produce an analog signal that indicates when scintillation events occur, and an energy of the gamma ray producing the detection event. Moreover, the photons emitted from one detector crystal can be detected by more than one PMT, and, based on the analog signal produced at each PMT, the detector crystal corresponding to the detection event can be determined using Anger logic and crystal decoding, for example.

FIG. 6 shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 10 and 11. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 6 shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 6, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data in accordance with method 100, pre-reconstruction processing of the detection data, and post-reconstruction processing of the image data, as discussed herein.

The processor 870 can be configured to perform method 100 described herein. The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 870 can execute a computer program including a set of computer-readable instructions that perform method 100 described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Celeron, Xenon, i3, i5, i7, or i9 processor from Intel of America or a Ryzen or an Opteron processor from AMID of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed image can be displayed on a display. The display can be an LCD display, CRT display, plasma display, OLED, LED or any other display known in the art.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network.

As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

Figure 7:
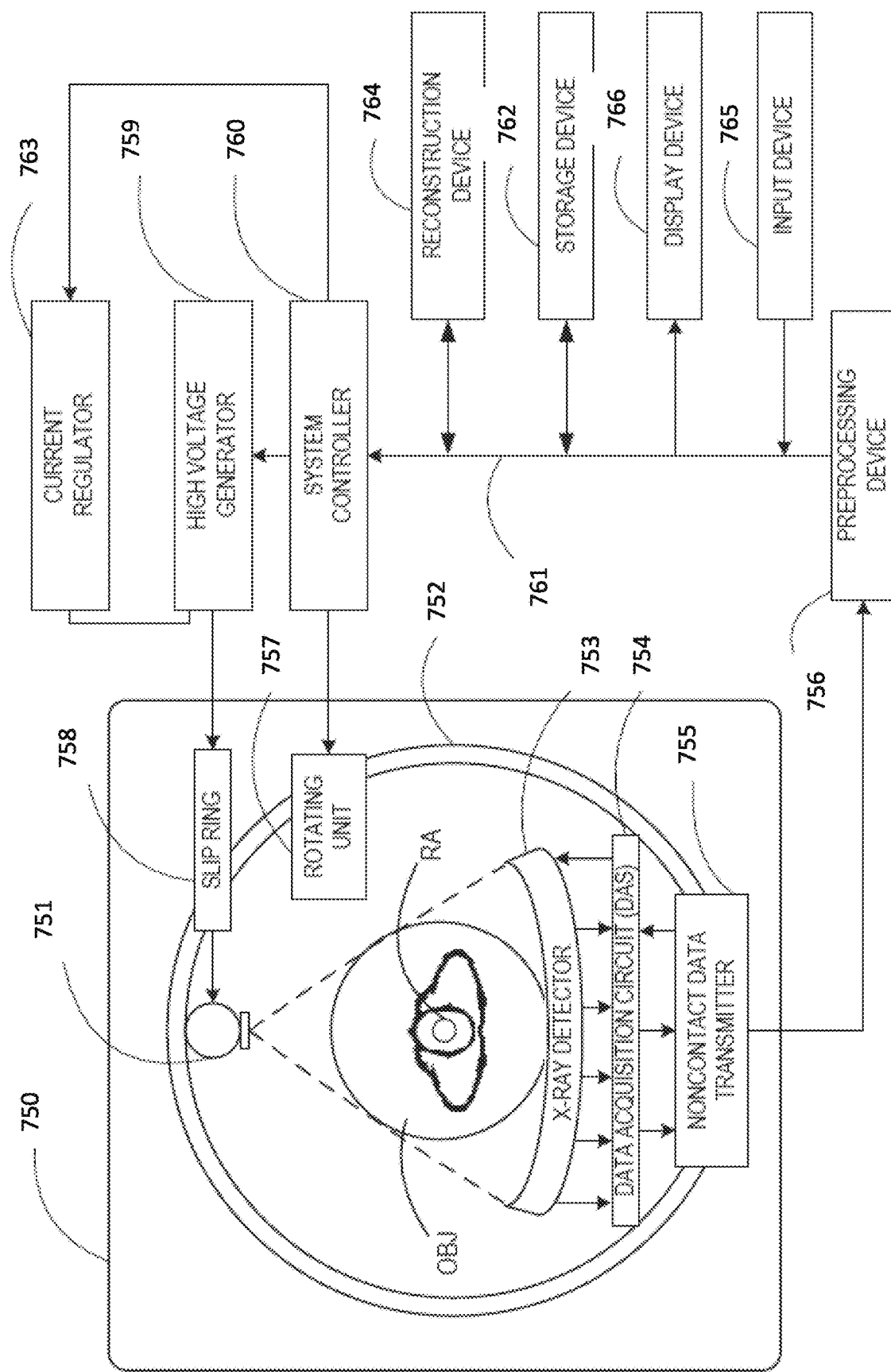
FIG. 7 is a schematic illustration of a Computed Tomography (CT) imaging system according to one aspect of the disclosure.

According to an embodiment of the present disclosure, the above-described methods for patient-specific imaging protocols can be implemented as applied to data from a CT apparatus or scanner. FIG. 7 illustrates an implementation of a radiography gantry included in a CT apparatus or scanner. As shown in FIG. 7, a radiography gantry 750 is illustrated from a side view and further includes an X-ray tube 751, an annular frame 752, and a multi-row or two-dimensional-array-type X-ray detector 753. The X-ray tube 751 and X-ray detector 753 are diametrically mounted across an object OBJ on the annular frame 752, which is rotatably supported around a rotation axis RA. A rotating unit 757 rotates the annular frame 752 at a high speed, such as 0.4 sec/rotation, while the object OBJ is being moved along the axis RA into or out of the illustrated page.

An embodiment of an X-ray CT apparatus according to the present disclosures will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosures can be applied to either type. In this case, the rotate/rotate-type, which is currently the mainstream, will be exemplified.

The multi-slice X-ray CT apparatus further includes a high voltage generator 759 that generates a tube voltage applied to the X-ray tube 751 through a slip ring 758 so that the X-ray tube 751 generates X-rays. The X-rays are emitted towards the object OBJ, whose cross-sectional area is represented by a circle. For example, the X-ray tube 751 having an average X-ray energy during a first scan that is less than an average X-ray energy during a second scan. Thus, two or more scans can be obtained corresponding to different X-ray energies. The X-ray detector 753 is located at an opposite side from the X-ray tube 751 across the object OBJ for detecting the emitted X-rays that have transmitted through the object OBJ. The X-ray detector 753 further includes individual detector elements or units and may be a photon-counting detector. In the fourth-generation geometry system, the X-ray detector 753 may be one of a plurality of detectors arranged around the object OBJ in a 360° arrangement.

The CT apparatus further includes other devices for processing the detected signals from the X-ray detector 753. A data acquisition circuit or a Data Acquisition System (DAS) 754 converts a signal output from the X-ray detector 753 for each channel into a voltage signal, amplifies the signal, and further converts the signal into a digital signal. The X-ray detector 753 and the DAS 754 are configured to handle a predetermined total number of projections per rotation (TPPR).

The above-described data is sent to a preprocessing device 756, which is housed in a console outside the radiography gantry 750 through a non-contact data transmitter 755. The preprocessing device 756 performs certain corrections, such as sensitivity correction, on the raw data. A memory 762 stores the resultant data, which is also called projection data at a stage immediately before reconstruction processing. The memory 762 is connected to a system controller 760 through a data/control bus 761, together with a reconstruction device 764, input device 765, and display 766. The system controller 760 controls a current regulator 763 that limits the current to a level sufficient for driving the CT system. In an embodiment, the system controller 760 implements optimized scan acquisition parameters.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 751 and the X-ray detector 753 are diametrically mounted on the annular frame 752 and are rotated around the object OBJ as the annular frame 752 is rotated about the rotation axis RA. In the fourth-generation geometry system, the detectors are fixedly placed around the patient and an X-ray tube rotates around the patient. In an alternative embodiment, the radiography gantry 750 has multiple detectors arranged on the annular frame 752, which is supported by a C-arm and a stand.

The memory 762 can store the measurement value representative of the irradiance of the X-rays at the X-ray detector unit 753. Further, the memory 762 can store a dedicated program for executing the CT image reconstruction, material decomposition, and PQR estimation methods including methods described herein.

The reconstruction device 764 can execute the above-referenced methods, described herein. The reconstruction device 764 may implement reconstruction according to one or more optimized image reconstruction parameters. Further, reconstruction device 764 can execute pre-reconstruction processing image processing such as volume rendering processing and image difference processing as needed.

The pre-reconstruction processing of the projection data performed by the preprocessing device 756 can include correcting for detector calibrations, detector nonlinearities, and polar effects, for example.

Post-reconstruction processing performed by the reconstruction device 764 can include generating a filter and smoothing the image, volume rendering processing, and image difference processing, as needed. The image reconstruction process may implement the optimal image reconstruction parameters derived above. The image reconstruction process can be performed using filtered back projection, iterative image reconstruction methods, or stochastic image reconstruction methods.

The reconstruction device 764 can use the memory to store, e.g., projection data, forward projection training data, training images, uncorrected images, calibration data and parameters, and computer programs. The reconstruction device 764 may also include processing support for machine learning, including calculating a reference data set based on the obtained spatial distribution in the soft tissue region and generating a filter by performing all or a portion of the machine learning process with the projection data set as input data and the reference data set as teacher data. Application of the machine learning, which may include application of an artificial neural network, also allows for the generation of one or more assessment values that are representative of the image quality.

The reconstruction device 764 and the denoising apparatus described may be implemented by one processor individually or in a network or cloud configuration of processors. The reconstruction device 764 and the denoising apparatus can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VDHL, Verilog, or any other hardware description language and the code may be stored in an electronic memory directly within the FPGA or CPLD, or as a separate electronic memory. Further, the memory 762 can be non-volatile, such as ROM, EPROM, EEPROM or FLASH memory. The memory 762 can also be volatile, such as static or dynamic RANI, and a processor, such as a microcontroller or microprocessor, can be provided to manage the electronic memory as well as the interaction between the FPGA or CPLD and the memory. In an embodiment, the reconstruction device 764 can include a CPU and a graphics processing unit (GPU) for processing and generating reconstructed images. The GPU may be a dedicated graphics card or an integrated graphics card sharing resources with the CPU, and may be one of a variety of artificial intelligence-focused types of GPUs, including NVIDIA Tesla and AMD Fire Stream.

Alternatively, the CPU in the reconstruction device 764 can execute a computer program including a set of computer-readable instructions that perform the functions described herein, the program being stored in any of the above-described non-transitory electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a XEON® processor from Intel® of America or an OPTERON™ processor from AMD of America and an operating system, such as Microsoft® 10, UNIX®, SOLARIS®, LINUX®, Apple MAC-OS® and other operating systems known to those skilled in the art. Further, the CPU in the reconstruction device 764 can be implemented as multiple processors cooperatively working in parallel to perform the instructions.

In one implementation, the reconstructed images can be displayed on a display 766. The display 766 can be an LCD display, CRT display, plasma display, OLED, LED, or any other display known in the art.

The memory 762 can be a hard disk drive, CD-ROM drive, DVD drive, FLASH drive, RAM, ROM, or any other electronic storage known in the art.

In addition to the other embodiments described above, additional embodiments are disclosed in the parentheticals listed below.

(1) A method for denoising an image, the method including, but not limited to: receiving a first medical image including a first image of an anatomical structure; receiving a second medical image including a second image of the anatomical structure; and training a deep image prior (DIP) neural network to produce a denoised image by inputting the second medical image to the DIP neural network and combining a converging noise and an output of the DIP network during the training such that the converging noise combined with the output of the DIP network approximates the first medical image at the end of the training, wherein the output of the DIP network represents the denoised image.

(2) The method according to (1), wherein training the DIP neural network comprises using a double over-parameterized training process on the converging noise.

(3) The method according to either of (1) or (2), wherein training the DIP neural network includes, but is not limited to: initializing first and second noise vectors; and training the DIP neural network to produce the denoised image by training the first and second noise vectors to equal values for which a convolution-based function based on the first and second noise vectors converges to a noise of the first medical image; and training the DIP neural network to approximate the first medical image minus the convolution-based function.

(4) The method according to any one of (1)-(3), wherein the first medical image is a Position Emission Tomography (PET) image of a subject.

(5) The method according to (4), wherein the second medical image is a Computed Tomography (CT) image of the subject registered to the PET image.

(6) The method according to (4), wherein the second medical image is a Magnetic Resonance Imaging (MRI) image of the subject registered to the PET image.

(7) The method according to one of (1)-(3), wherein the first medical image is single-photon emission computerized tomography (SPECT) image of a subject.

(8) The method according to (7), wherein the second medical image is a Computed Tomography (CT) image of the subject registered to the SPECT image.

(9) The method according to (7), wherein the second medical image is a Magnetic Resonance Imaging (MRI) image of the subject registered to the SPECT image.

(10) The method according to one of (1)-(3), wherein the first medical image is an ungated cardiac Computed Tomography (CT) image of a subject.

(11) The method according to (10), wherein the second medical image is a gated CT image of the subject registered to the ungated CT image.

(12) A medical image processing apparatus, including, but not limited to: processing circuitry configured to: receive a first medical image including a first image of an anatomical structure; receive a second medical image including a second image of the anatomical structure; and train a deep image prior (DIP) neural network to produce a denoised image by inputting the second medical image to the DIP neural network and combining a converging noise and an output of the DIP network during the training such that the converging noise combined with the output of the DIP network approximates the first medical image at the end of the training, wherein the output of the DIP network represents the denoised image.

(13) The apparatus according to (12), wherein the processing circuitry configured to train the DIP neural network comprises processing circuitry configured to use a double over-parameterized training process on the converging noise.

(14) The apparatus according to (12), wherein processing circuitry configured to train the DIP neural network comprises processing circuitry configured to: initialize first and second noise vectors; and train the DIP neural network to produce the denoised image by training the first and second noise vectors to equal values for which a convolution-based function based on the first and second noise vectors converges to a noise of the first medical image; and train the DIP neural network to approximate the first medical image minus the convolution-based function.

(15) The apparatus according to any one of (12)-(14), wherein the first medical image is a Position Emission Tomography (PET) image of a subject.

(16) The apparatus according to (15), wherein the second medical image is a Computed Tomography (CT) image of the subject registered to the PET image.

(17) The apparatus according to (15), wherein the second medical image is a Magnetic Resonance Imaging (MRI) image of the subject registered to the PET image.

(18) The apparatus according to one of (12)-(14), wherein the first medical image is single-photon emission computerized tomography (SPECT) image of a subject.

(19) The apparatus according to (18), wherein the second medical image is a Computed Tomography (CT) image of the subject registered to the SPECT image.

(20) The apparatus according to (18), wherein the second medical image is a Magnetic Resonance Imaging (MRI) image of the subject registered to the SPECT image.

(21) The apparatus according to one of (12)-(14), wherein the first medical image is an ungated cardiac Computed Tomography (CT) image of a subject.

(22) The apparatus according to (21), wherein the second medical image is a gated CT image of the subject registered to the ungated CT image.

(23) A non-transitory computer-readable storage medium storing computer-readable instructions that, when executed by a computer, cause the computer to perform the methods of any one of (1)-(11).

Obviously, numerous modifications and variations are possible in light of the above teachings. It is therefore to be understood that within the scope of the appended claims, the disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for denoising an image, the method comprising:
   receiving a first medical image including a first image of an anatomical structure;
   receiving a second medical image including a second image of the anatomical structure; and
   training at least one deep image prior (DIP) neural network to produce a denoised image by inputting the second medical image to the at least one DIP neural network and combining a converging noise and an output of the at least one DIP network during the training such that the converging noise combined with the output of the at least one DIP network approximates the first medical image at the end of the training, wherein the output of the DIP network represents the denoised image,
   wherein the step of training the at least one DIP neural network comprises
      initializing first and second noise vectors;
      training the at least one DIP neural network to produce the denoised image by training the first and second noise vectors to be equal to values for which a convolution-based function based on the first and second noise vectors converges to a noise of the first medical image; and
      training the at least one DIP neural network to approximate the first medical image minus the convolution-based function, and
   wherein the step of training the at least one DIP neural network further comprises training a plurality of DIP neural networks as the at least one DIP neural network using respectively different parameters.

2. The method according to claim 1, wherein the step of training the at least one DIP neural network comprises using a double over-parameterized training process on the converging noise.

3. The method according to claim 1, wherein the first medical image is a Position Emission Tomography (PET) image of a subject.

4. The method according to claim 3, wherein the second medical image is a Computed Tomography (CT) image of the subject registered to the PET image.

5. The method according to claim 3, wherein the second medical image is a Magnetic Resonance Imaging (MRI) image of the subject registered to the PET image.

6. The method according to claim 1, wherein the first medical image is single-photon emission computerized tomography (SPECT) image of a subject.

7. The method according to claim 6, wherein the second medical image is a Computed Tomography (CT) image of the subject registered to the SPECT image.

8. The method according to claim 6, wherein the second medical image is a Magnetic Resonance Imaging (MRI) image of the subject registered to the SPECT image.

9. The method according to claim 1, wherein the first medical image is an ungated cardiac Computed Tomography (CT) image of a subject.

10. The method according to claim 9, wherein the second medical image is a gated CT image of the subject registered to the ungated cardiac CT image.

11. A medical image processing apparatus, comprising:
    processing circuitry configured to:
       receive a first medical image including a first image of an anatomical structure;
       receive a second medical image including a second image of the anatomical structure; and
       train at least one deep image prior (DIP) neural network to produce a denoised image by inputting the second medical image to the at least one DIP neural network and combining a converging noise and an output of the at least one DIP network during the training such that the converging noise combined with the output of the at least one DIP network approximates the first medical image at the end of the training, wherein the output of the at least one DIP network represents the denoised image,
    wherein, in training the at least one DIP neural network, the processing circuitry is further configured to
       initialize first and second noise vectors;
       train the at least one DIP neural network to produce the denoised image by training the first and second noise vectors to be equal to values for which a convolution-based function based on the first and second noise vectors converges to a noise of the first medical image; and
       train the at least one DIP neural network to approximate the first medical image minus the convolution-based function, and
    wherein the processing circuitry is further configured to train a plurality of DIP neural networks as the at least one DIP neural network using respectively different parameters.

12. The apparatus according to claim 11, wherein the processing circuitry configured to train the at least one DIP neural network is further configured to use a double over-parameterized training process on the converging noise.

13. A non-transitory computer-readable storage medium storing computer-readable instructions that, when executed by a computer, cause the computer to perform the steps of:
    receiving a first medical image including a first image of an anatomical structure;
    receiving a second medical image including a second image of the anatomical structure; and
    training at least one deep image prior (DIP) neural network to produce a denoised image by inputting the second medical image to the at least one DIP neural network and combining a converging noise and an output of the at least one DIP network during the training such that the converging noise combined with the output of the at least one DIP network approximates the first medical image at the end of the training, wherein the output of the at least one DIP network represents the denoised image, wherein the step of training the at least one DIP neural network comprises initializing first and second noise vectors;

training the at least one DIP neural network to produce the denoised image by training the first and second noise vectors to be equal to values for which a convolution-based function based on the first and second noise vectors converges to a noise of the first medical image; and training the at least one DIP neural network to approximate the first medical image minus the convolution-based function, and wherein the step of training the at least one DIP neural network further comprises training a plurality of DIP neural networks as the at least one DIP neural network using respectively different parameters.

14. The non-transitory computer-readable storage medium according to claim 13, wherein the step of training the at least one DIP neural network comprises using a double over-parameterized training process on the converging noise.

* * * * *